(No Model.)
C. W. E. PIEFKE.
FILTER.
No. 335,040. Patented Jan. 26, 1886.
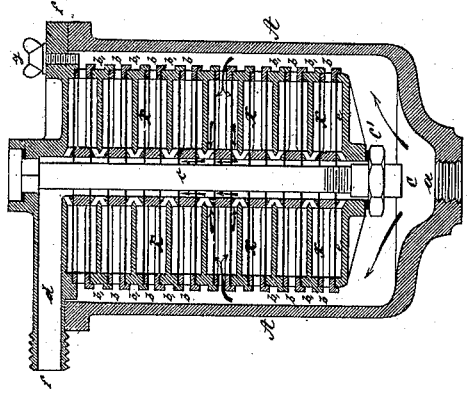
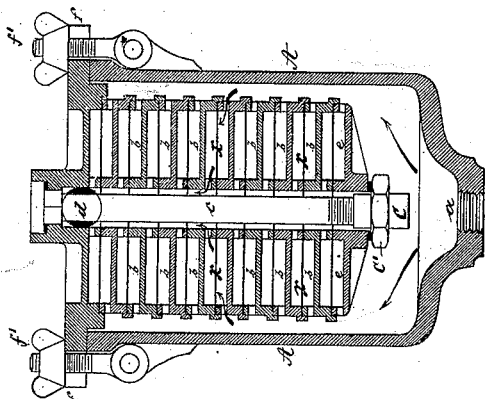
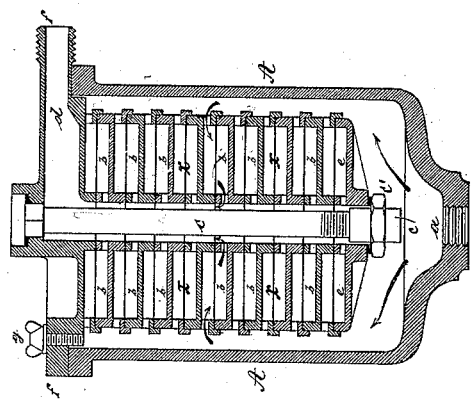
Witnesses:
Inventor:
Carl Wilhelm Emanuel Piefke
by Goepel & Raegener
Attorneys.

United States Patent Office.

CARL WILHELM EMANUEL PIEFKE, OF BERLIN, GERMANY.

FILTER.

SPECIFICATION forming part of Letters Patent No. 335,040, dated January 26, 1886.

Application filed April 24, 1885. Serial No. 163,258. (No model.) Patented in Germany January 13, 1885, No. 32,634; in Austria-Hungary January 23, 1885, No. 22,855 and No. 44,570; in France February 4, 1885, No. 166,795, and in England February 20, 1885, No. 2,345.

*To all whom it may concern:*

Be it known that I, CARL WILHELM EMANUEL PIEFKE, a subject of the King of Prussia, German Empire, and a resident of the city of Berlin, have invented certain new and useful Improvements in Filtering Apparatuses, of which the following is a specification.

This invention has reference to an improved filtering apparatus in which filtering-chambers of circular shape are used, that are superposed one above the other and united to a battery of filters. This construction differs from that shown in the patent heretofore granted to me under date of January 27, 1885, No. 311,257, inasmuch as in the latter loose filtering material is arranged in layers and spread uniformly over screens, while in the present construction disks of filtering material are employed; and the invention consists of a series of ring-shaped frames that are alternately provided with inlet-openings in the outer rims and outlet-openings in the inner rims, said frames supporting intermediate disks of filtering material, so as to form a series of filtering-chambers which are inclosed by an exterior vessel having a supply and discharge channel, as will more fully appear hereinafter.

In the accompanying drawings, Figures 1, 2, and 3 represent vertical central sections of my improved filtering apparatus, showing different modifications of the same.

Similar letters of reference indicate corresponding parts.

In the drawings, $b\ b$ represent the individual filtering-frames, which are made of ring shape, and provided at the inner and outer circumferences with rims, as shown in Figs. 1 and 2.

Between the frames $b\ b$ are interposed filtering-disks $x\ x$, which form, with the horizontal part of each frame $b$, an upper and a lower filtering-space.

In Fig. 1 the lower parts of the outer rims of each frame $b$ have inlet-openings, while the upper part of the inner rims have outlet-openings.

In Fig. 2 the inlet-openings are arranged in the upper parts of the outer rims, and the outlet-openings diagonally opposite thereto in the lower parts of the inner rims. In both instances the outer rims are provided with flanges on one edge adapted to overlap the contiguous rims, and hold them in relative position when they are assembled in a pile. By thus superposing a number of ring-shaped frames and intermediate disks of any suitable filtering material a filtering-battery is obtained which is rigidly bound together by a screw-rod, $c$, that passes centrally through the bottom plate, $e$, and a cover, $f$, and that is secured thereto by a screw-nut, $c'$, and enlarged head, as shown in Figs. 1 to 3. The battery of filtering-chambers is inclosed by an exterior vessel, A, that is closed by the cover $f$, which is attached thereto by screws $f'$. The liquid to be filtered enters through the bottom channel, $a$, of the vessel A, passes in upward direction through the inlet-openings of the outer rims into the chambers, and through the interposed disks and outlet-openings of the inner rims into the central space inclosed by the frames. The liquid passes in upward direction in this space, and is conducted off through an exit-channel, $d$, of the cover. The direction of motion of the liquid passing through the filter can also be reversed by allowing the liquid to enter through the top channel and to leave through the bottom channel.

Fig. 3 shows a modified form of the apparatus, which is a combination of the filters shown in Figs. 1 and 2. In this filter are employed alternately-superposed filtering-frames $b\ b$ and $b'\ b'$, of which the frames $b'\ b'$ are provided with horizontal partitions and inner rims having openings above and below the partitions.

The filtering-frames $b\ b$ have in place of the horizontal partitions arms for connecting the two concentric rims and openings in the exterior rims.

In place of the frames $b'\ b'$, the filtering-frames $b\ b$ may be provided with partitions, and perforated at both sides of the same in the outer rim, in which case the frames $b'\ b'$ are provided with connecting-arms.

Between the filtering-frames $b\ b$ and $b'\ b'$ are interposed filtering-disks that are rigidly secured in position by the frames. The bottom plate, e, and the cover f are connected by a central screw-rod, c, in the same manner as in the filters shown in Figs. 1 and 2.

The filtering operation takes place in the same manner as in the filters before described. The liquor to be filtered enters through the bottom channel, a, and passes through the inlet-openings in the outer rims of the frames b b into an annular space that is inclosed at the top and bottom by filtering-disks. The liquid percolates through these disks and is discharged through the outlet-openings of the inner rims of the frames b' b' into the center channel around the screw-rod c, whence it is conducted off through the top channel, d. In case the partitions of the frames b' b' have been substituted by arms, the filtered liquid is united in the space formed between the cylindrical rims of these frames and the two filtering-disks. The direction of motion of the liquid to be filtered can be reversed in the same manner as in Figs. 1 and 2. The entire filtering apparatus can also be reversed, so that the inlet-channel a is at the top and the cover at the bottom. According to the size, thickness, and texture of the filtering-disks, they may either be supported by means of ribs on the horizontal partitions, or by screens or other means, or held simply by the frames without any intermediate supports.

For the purpose of admitting the air to pass from the interior to the outside of the apparatus, a vent cock or screw, g, is arranged in the cover of the apparatus, as shown in Figs. 1 and 3.

The advantages of the filtering apparatus are that it is of very compact shape, as the different frames composing the same are of comparatively small height; that it can be readily taken to pieces and put together again whenever the filtering-disks have to be replaced by new ones, and that a very effective filtering action is obtained.

Having thus described my invention, I claim as new and desire to secure by Letters Patent—

1. In a filter, the combination, with a cylindrical inclosing-vessel having central bottom inlet-opening and top outlet-opening, of a battery of filtering-chambers concentric therewith supported therein remote from the sides and bottom thereof, said filtering-chambers having inlet-openings in their outer rims on one side of the filtering material in the chambers, and outlet openings in their inner rims on the other side of said filtering material communicating with the outlet-opening in said inclosing-vessel, substantially as described.

2. In a filter, the combination, with a cylindrical inclosing-vessel having central bottom inlet-opening and top outlet-opening, of a battery of filtering-chambers concentric therewith supported therein remote from the sides and bottom thereof, said filtering-chambers consisting of concentric inner and outer rings forming side rims, and an interposed circular plate integral therewith, said outer rims being provided with inlet-openings on one side of said plate, and said inner rims with outlet-openings on the other side thereof, filtering-sheets adapted to be clamped between each pair of contiguous rims, and means for clamping said filtering-chambers together in a battery, substantially as described.

3. In a filter, the combination, with a cylindrical inclosing-vessel having central bottom inlet-opening and top outlet-opening, of a battery of filtering-chambers concentric therewith supported therein remote from the sides and bottom thereof, said filtering-chambers consisting of concentric inner and outer rings forming side rims, and an interposed circular plate integral therewith, said outer rims being provided with inlet-openings on one side of said plate, and said inner rims with outlet-openings on the other side thereof, filtering-sheets adapted to be clamped between each pair of contiguous rims, and a screw-rod supported in the upper end of said inclosing-vessel and passing through the central openings in said filtering-chambers, but smaller in diameter than said central openings, and a nut on said screw-rod for clamping said filtering-chambers together, substantially as described.

4. In a filter, the combination, with a cylindrical inclosing-vessel having central bottom inlet-opening and top outlet-opening, of a battery of filtering-chambers concentric therewith supported therein remote from the sides and bottom thereof, said filtering-chambers consisting of concentric inner and outer rings, forming side rims, and an interposed circular plate integral therewith, said outer rims being provided with inlet-openings on one side of said plate, and said inner rims with outlet-openings on the other side thereof, filtering-sheets adapted to be clamped between each pair of contiguous rims, and means for clamping said filtering-chambers together in a battery, said outer rims being provided with flanges on one edge adapted to overlap the next contiguous rim and hold the pile in position when the parts are clamped together, substantially as described.

In testimony that I claim the foregoing as my invention I have signed my name in presence of two subscribing witnesses.

CARL WILHELM EMANUEL PIEFKE.

Witnesses:
RUDOLF ZORN,
OTTO SCHONERT.